Feb. 19, 1935.    W. P. STRICKLAND    1,991,825
ANTITHEFT DEVICE
Filed Sept. 21, 1933
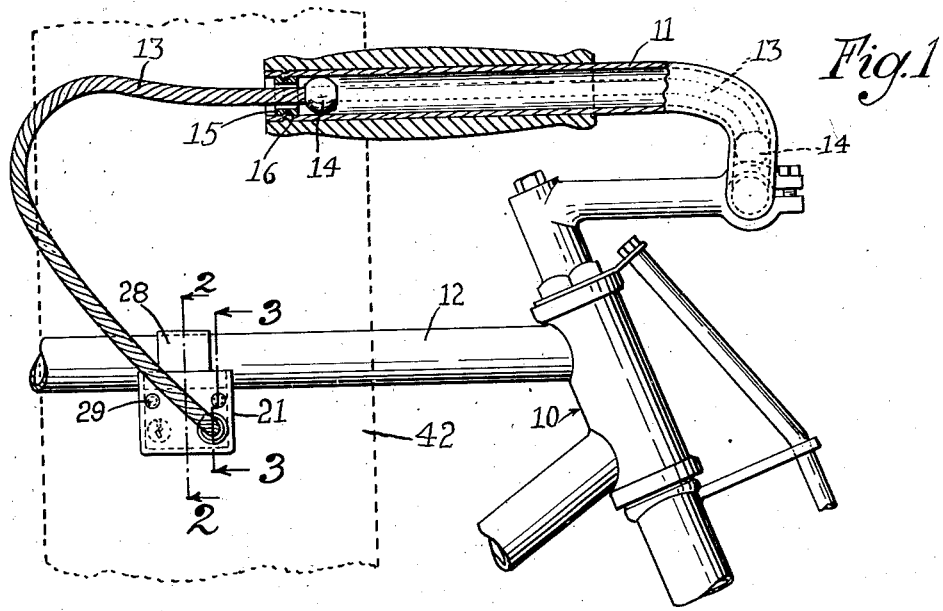
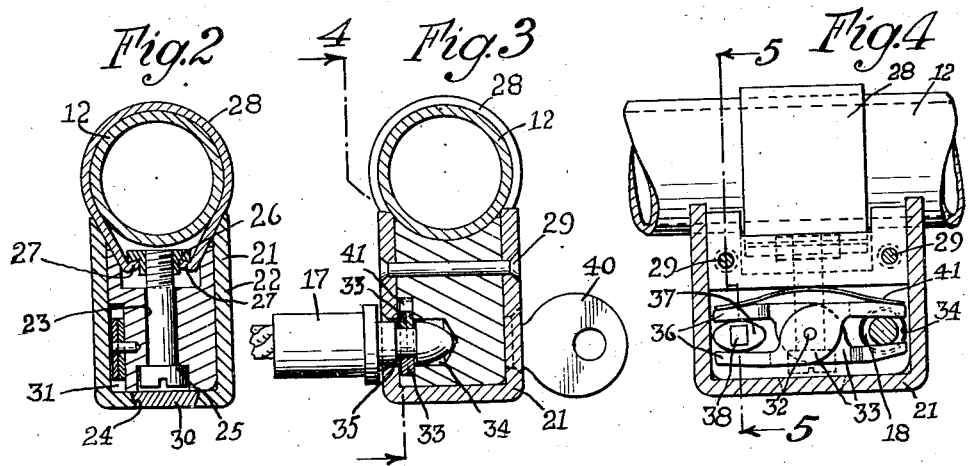
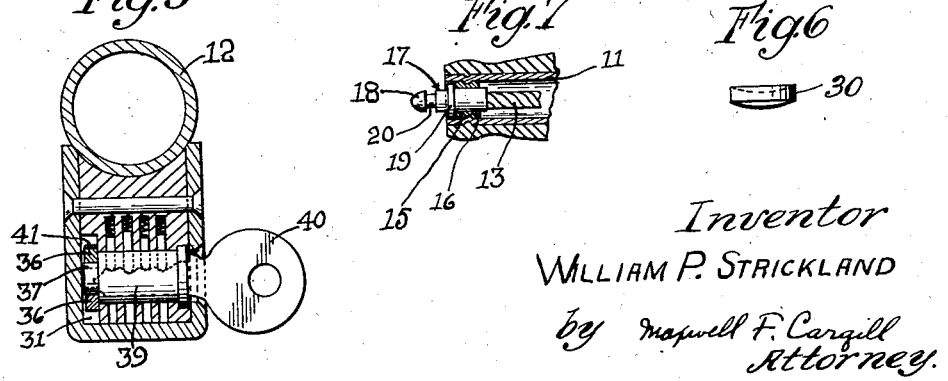
Inventor
WILLIAM P. STRICKLAND
by Maxwell F. Cargill
Attorney.

Patented Feb. 19, 1935

1,991,825

UNITED STATES PATENT OFFICE 1,991,825

ANTI-THEFT DEVICE

William P. Strickland, Chicago, Ill.

Application September 21, 1933, Serial No. 690,342

2 Claims. (Cl. 70—90)

This invention relates to improvements in anti-theft devices.

The principal object of the invention is to provide a device by which a bicycle can readily be secured against theft to a post, tree or the like, but which when not in use, is concealed largely within the hollow handle bar or other tubular portion of the bicycle frame.

A further object of the invention is to provide a device comprising a member which can be concealed, when not in use, within a tubular portion of the bicycle, such as the handle bar, for example, the member preferably being a flexible cable having a stop which is secured to the inner end of the cable against removal from the handle bar or other hollow portion of the vehicle while the forward end of the cable is provided with a member adapted to be engaged by a lock secured to the bicycle frame after the cable has been withdrawn from the tubular portion and has been placed around a post or tree or other convenient stationary object.

A further object of the invention relates to the provision of a lock adapted to be permanently secured to the frame of a bicycle and having a locking mechanism adapted to be unlocked by a key but which is arranged to engage automatically a headed stud carried by a flexible member anchored to the bicycle, the stud preferably being rotatably held by the locking mechanism to frustrate surreptitious breakage by turning or twisting the same with a tool.

Other objects of the invention relate to various features of construction and arrangement of parts which will be apparent from a consideration of the following specification and accompanying drawing, wherein:

Figure 1 is a fragmentary view of a bicycle showing an embodiment of my improvements attached thereto.

Figure 2 is a vertical section through the lock taken on line 2—2 of Figure 1,

Figure 3 is a vertical sectional view taken on line 3—3 of Figure 1,

Figure 4 is a vertical sectional view taken on line 4—4 of Figure 3,

Figure 5 is a sectional view taken on line 5—5 of Figure 4,

Figure 6 is an elevation of a plug for closing the openings in the lock casing after the latter has been attached to a bicycle, Figure 7 is a broken view partly in section of the handle bar grip illustrating the position of the outer end of a portion of the device when in inoperative position.

In the drawing, a bicycle is indicated generally by the numeral 10 and is provided with conventional tubular handle bars 11, and a conventional tubular frame, a portion of which is indicated by the numeral 12.

The anti-theft device comprises a flexible member 13 such as a steel cable for example, having secured at one end a stop member 14 of a size adapted to slide within the handle bar 11 or other tubular portion of the bicycle.

The flexible member 13 passes through a ring 15 which may be secured in the handle bar 11 by any suitable means. In the form shown the ring is provided with a circumferential groove 16 into which a portion of the handle bar may be depressed, as shown in Figure 1, for securing the ring in position. The stop 14 is disposed inwardly of the ring 15 and can be slid along the interior of the bar when the anti-theft device is not in use. The forward end of the flexible member 13 is provided with a stud 17 which terminates in a head 18. The stud 17 is preferably provided with a flange 19 for limiting the inward movement of the flexible member into the handle bar as illustrated in Figure 7. At the rear of the head 18 is a circumferential groove 20 hereinafter referred to.

The lock portion of the device comprises the casing 21 which houses the body 22. The latter member is provided with a central passage 23 through which and through a tapered opening 24 in the bottom of the casing a headed bolt 25 can be inserted. The bolt is provided with a nut 26 having under-cut lateral edges as shown in Figure 2, for engaging the inwardly turned ends 27 of the metal strap or yoke 28, which is adapted to embrace the tubular portion 12 of the bicycle frame, as shown in Figures 1 to 4.

In attaching the lock to the frame 12, the ends of the strap can be sprung apart sufficiently to embrace the frame as shown in Figure 2, and the bolt 24 then turned into the nut 26 for securing the casing and the lock mechanism in position. The casing 21 may be secured to the body or block 22 by means of rivets 29.

To close the opening 24 in the lower wall of the casing through which the bolt is inserted, a plug 30 such as is shown in Figure 6 for example, may be employed. The plug is of metal and is somewhat dished, as illustrated. This plug may be inserted in the opening 24 and then hammered flat into engagement with the inclined side walls of the opening, as illustrated in Figure 2.

On one side of the body or block 22 is a longitudinal chamber 31 in which are pivoted as at 32 a pair of latch members 33. As shown in Figure 4, the right hand ends of the members 33 overlie upper and lower portions of a recess 34 formed in the block 22, which recess registers with an opening 35 in the casing 21. The opposite ends 36 of the members 33 span a cam 37 which is carried on the end 38 of a conventional barrel type key operable lock 39. Thus by turning the barrel by means of the key 40 the cam 37 will force the ends 36 of the members 33 apart against the action of a spring 41, and effect the movement of the right hand ends of the members 33 apart, which will release the stud 18 previously inserted in the recess 34.

Thus, in Figure 3, the stud 17 is shown in locked position with the right hand ends of the members 33 disposed in the channel 20 of the stud. The engagement of the head 18 by the members 33 will thus prevent the withdrawal of the stud from the recess until the lock has been operated by the key to effect the separation of the ends 36 as above described.

It will be noted that while the stud cannot be withdrawn from the lock casing without the use of the key, it may be freely rotated. This arrangement precludes breaking the stud by twisting it with a tool, should a thief attempt to take a bicycle which has been properly locked by means of the present improvements.

In Figure 1 a post 42 or other stationary article is illustrated in dotted lines, to which the bicycle is secured. Thus when it is desired to secure a bicycle against theft, it is only necessary to stand the bicycle against a post, tree, or the like 42, withdraw the cable from the hollow handle bar, and insert the stud 17 into the locking position shown in Figure 3, the cable 13, of course, being brought around the object 42 before inserting the stud in locking position. The head 18 of the stud is preferably somewhat pointed and upon inserting the same into locking position will spread the ends of the latch members 33 apart against the action of the spring 41 which will cause the members 33 to snap into locking position in the groove 20.

To release the bicycle the owner uses the key 40 to release the stud, and then slides the cable 13 and stop 14 inwardly of the hollow handle bar 11 to the position shown in Figure 7, where only the forward portion of the stud is exposed. In Figure 1, the cable is shown in inoperative position by dotted lines.

While it will be apparent that the flexible member 13 may be arranged to slide in some other hollow portion of the bicycle frame, it is found more convenient to locate it in one of the handle bars.

It will also be apparent that while the present improvements have been described as particularly adapted for locking bicycles, it may be adapted for use in conjunction with other vehicles as well, and I therefore, do not wish to be restricted to the specific embodiments of the invention herein shown and described, except as so limited by the appended claims.

I claim:

1. A lock comprising a casing, a block in said casing having a key rotatable cylinder therein, arm releasing means secured to the end of said cylinder at one side of said block, a recess in said block for receiving a headed member to be locked therein, and a pair of spring actuated latch arms within the casing and pivoted intermediate the ends thereof to said block, one end of each of said arms normally traversing said recess for snapping into engagement with said headed member when inserted between the same and into said recess, the opposite ends of said arms being disposed for engagement by said releasing means when said cylinder is rotated to effect the release of said headed member.

2. A bicycle lock for securing a bicycle to a stationary object comprising a flexible member adapted normally to be slidably and rotatably housed within a hollow handle bar, the inner end of said member and said handle bar having relatively rotatable cooperative means to restrain complete withdrawal of said flexible member therefrom, the outer end of said flexible member being provided with a headed stud, a lock casing having means for permanently securing the same to a frame section of the bicycle and provided with a recess for receiving the head of said stud after the flexible member has been placed around a stationary object, locking means in said casing arranged to rotatably engage the head of said stud when the latter has been pressed into said recess whereby said flexible member is freely rotatable throughout the entire length thereof, and key operable means for said lock for releasing said head to permit withdrawal of said stud.

WILLIAM P. STRICKLAND.